United States Patent [19]

Kikuchi

[11] Patent Number: 4,986,390

[45] Date of Patent: Jan. 22, 1991

[54] PORTABLE SLOW DESCENDER

[76] Inventor: Takeshi Kikuchi, 6-23, Shinmei-cho, Morioka-Shi, Iwate-Ken 020, Japan

[21] Appl. No.: 392,992

[22] PCT Filed: Nov. 19, 1987

[86] PCT No.: PCT/JP87/00907

§ 371 Date: Jun. 8, 1989

§ 102(e) Date: Jun. 8, 1989

[87] PCT Pub. No.: WO88/04186

PCT Pub. Date: Jun. 16, 1988

[30] Foreign Application Priority Data

Dec. 8, 1986 [JP] Japan .......................... 61-189455[U]

[51] Int. Cl.$^5$ .......................... A62B 1/08; A62B 1/10; F16D 59/00

[52] U.S. Cl. .................................. 182/234; 182/239; 182/235

[58] Field of Search .................. 182/5, 6, 7, 234, 239, 182/235

[56] References Cited

U.S. PATENT DOCUMENTS

| | | | |
|---|---|---|---|
| 286,306 | 10/1883 | Johnson | 182/239 |
| 1,037,333 | 9/1912 | Schever | 182/239 |
| 1,435,366 | 11/1922 | Bassett | 182/239 |
| 1,782,951 | 11/1930 | Abbott | 182/239 |
| 2,479,459 | 8/1949 | Bassett | 182/234 |
| 2,729,425 | 1/1956 | Gschwind | 182/239 |
| 3,150,744 | 9/1964 | Fertier | 182/239 |
| 4,190,132 | 2/1980 | Desilets . | |
| 4,457,400 | 7/1984 | Donaldson | 182/239 |

FOREIGN PATENT DOCUMENTS

| | | |
|---|---|---|
| 49-9045 | 3/1974 | Japan . |
| 50-72495 | 6/1975 | Japan . |
| 52-3240 | 1/1977 | Japan . |
| 54-154200 | 12/1979 | Japan . |
| 59-111142 | 7/1980 | Japan . |

*Primary Examiner*—Reinaldo P. Machado

[57] ABSTRACT

The slow-descending device of this invention is so small and light that anybody can easily carry it in a traveling bag, or the like. Therefore, it is useful as an emergency evacuation device which enables him to escape from a fire in a hotel, apartment house, office building, etc., or from a disaster in a high level road or highway, etc.

7 Claims, 2 Drawing Sheets

PORTABLE SLOW DESCENDER

BACKGROUND OF THE INVENTION

1. Field of the Invention

This invention relates to a device used for the evacuation from a high building in cases such as a fire, particularly to a slow-descending device for evacuation which enables a person to descend safely from a high place, and more particularly to a portable slow-descending device for evacuation which anybody can carry for personal use.

2. Related Art

Although a building or other type of structure usually equipped with evacuation devices, they are not provided in every room, but are provided only in a particular room or rooms, or at a particular site or sites of a corridor or corridors. In the case of an emergency such as a fire, therefore, it is very likely that many people may rush to each evacuation device and cause a panic, or it is even likely that fire or smoke may prevent people from reaching to any of the places where those devices are provided, and to use them. An evacuation device having a lifeline formed from a metal wire is heavy and unsuitable for portable use. Moreover, it has a limit in the distance along which it enables a person to descend, i.e. the height of the story from which it enables the person to descend. Its use is limited to a low building having a height of, say, 30 m at a maximum. There is every likelihood that a person using it to escape from a high building may be suspended in the air. Thus, it has only a limited scope of use. There has also been proposed a device which includes a wire having a smaller diameter and a longer length. However, it is not only heavy, but is also liable to rusting by salt or moisture. Therefore, it is unsuitable as a device of the kind under consideration which is required to be semipermanently useful without undergoing any substantial change in quality.

There has also been proposed a device which includes a lightweight rope formed from a non-metallic material. It is, however, likely that when a load has acted upon the rope extending down from e.g. a reel on which it is wound, it may be deformed and caught between coils thereof on the reel, resulting in the failure of the rope to be smoothly unwound and the failure of the reel to turn smoothly, and that a person who is being rescued may, therefore, be suspended in the air.

There are known various types of mechanisms for slow-descending devices. A device employing a hydraulic system is likely to have a greatly varying descending speed which may depend on the weight of a person who is rescued. When it is used in a very cold place, however oil is likely to solidify. Moreover, a change in quality of oil or its leakage is likely to occur.

It is an object of this invention to provide a portable slow-descending device which can overcome the drawbacks of the devices described hereinabove.

SUMMARY OF THE INVENTION

The portable slow-descending device of this invention comprises a lifeline in the form of a tape made of synthetic or chemical fibers, a hook attached to one end of the lifeline, a reel on which the lifeline is wound a frame for supporting a reel supporting shaft rotatably at both ends thereof, a suspending ring connected to the frame and adapted for connecting the device to a person using it, a planetary gear acceleration unit embedded in the reel, and a centrifugal brake mechanism linked to the planetary gear acceleration unit.

The lifeline is preferably made of aramid fibers.

The device preferably also includes a manual control member which can selectively lock the centrifugal brake mechanism.

Moreover, the device preferably includes a manual member for rewinding the lifeline on the reel.

DESCRIPTION OF PREFERRED EMBODIMENTS

Figure 1:
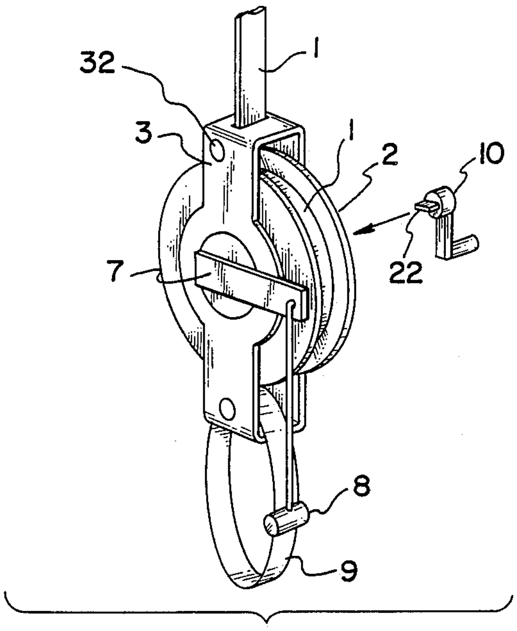
FIG. 1 is a perspective view showing the major part of a portable slow-descending device embodying this invention.
Figure 2:
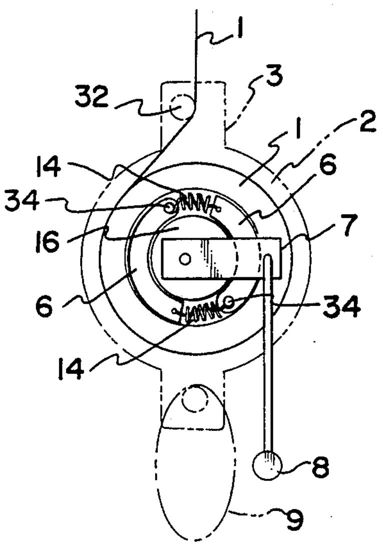
FIG. 2 a schematic view showing a centrifugal brake mechanism and a manual control member therefor.
Figure 3:
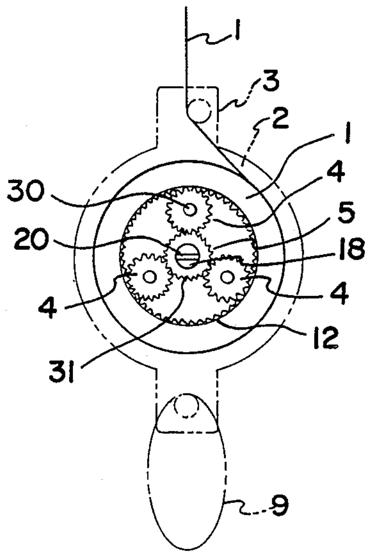
FIG. 3 is a schematic view showing a planetary gear acceleration unit.
Figure 4:
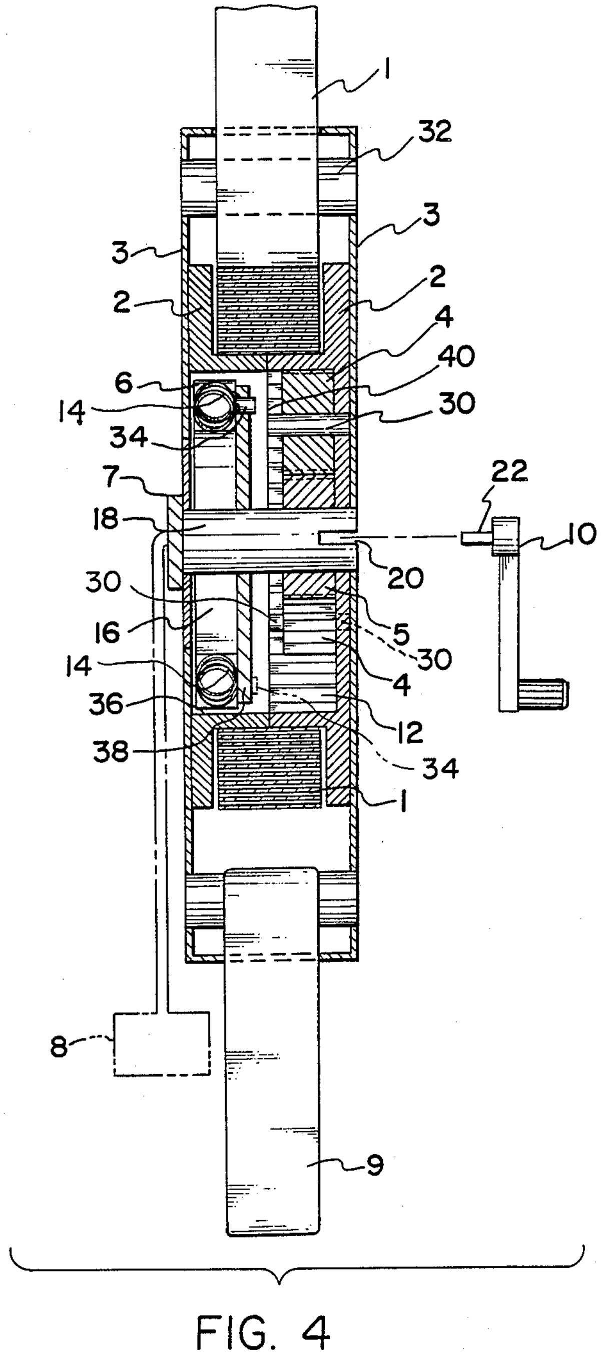
FIG. 4 is a cross-sectional view of the portable slow descender.

A device embodying this invention is generally shown in FIG. 1. It includes a lifeline 1 in the form of a tape made of synthetic or chemical fibers, and wound superposedly on a reel 2. The lifeline 1 has one end not shown, but provided with an appropriately shaped hook which is used for fastening the lifeline 1 to an appropriate part of a building. The reel 2 is supported on a shaft 18 which is rotatably supported on a supporting frame 3 at both ends thereof. A centrifugal brake mechanism which is schematically shown in FIG. 2, and a planetary gear acceleration unit which is schematically shown in FIG. 3 are juxtaposed to each other in the interior of the reel 2 and separated by wall 40 as shown in FIG. 4. The planetary gear acceleration unit comprises three equally spaced apart planetary pinions 4 rotating about shafts 30, a sun gear 5 meshing with the pinions 4, and a large planet gear 12 secured to the reel 2 and meshing with the pinions 4. The centrifugal brake mechanism includes a centrifugal weight 6 which surrounds shaft 18 of the sun gear 5 and rotates with rotation of the sun gear 5. The centrifugal weight which is schematically shown in FIG. 2 is of the type substantially semilunar members 6,6 which are fixed at points 34 and to a shoe holder 38 integrally connected to the shaft 18 as is sun gear 5 and normally urged radially inwardly toward each other by springs 14 against an inner periphery 36 of reel 2. It is, however, possible to use any other type of centrifugal weight known in the art, too. The centrifugal brake mechanism further includes a cam 16 provided in its center, a manual brake arm 7 connected to the cam, and a knob 8 connected to the arm 7. A suspending ring 9 is connected to the frame 3, but may be replaced by a life jacket or any other similar device. The shaft 18 on which the sun gear 5 is supported has one end provided with a recess 20 into which a handle 10 having corresponding protrusion 22 for rewinding the tape can be connected.

FIG. 4 is a cross-sectional view showing details of the relationship between the centrifugal brake chamber of FIG. 2 and the planetary gear chamber of FIG. 3.

The lifeline 1 in the form of a tape is preferably formed from synthetic or chemical fibers, such as aramid fibers (Kepler). The lifeline formed from these materials is light in weight, strong, has a high degree of heat resistance (capable of withstanding a temperature of about 450° C.), and does not form rust. Therefore, it is semipermanently useful. As it is a tape, it is unlikely to get caught between its own coils on the reel, as opposed to a rope, and can, therefore, have a length which is as long as about 100 m. It is very long, as compared with the conventionally employed ropes having a length of only about 30 to 40 m. The tape also has the effect of preventing the swiveling of the device.

If a manual control member is provided for locking the centrifugal brake mechanism selectively, it is possible to control the descending speed of the device. It is also possible to stop the device at any desired position during its descent and it is, therefore, possible, for example, for a person descending from a 20-story or higher building to stop at a lower story and escape into the same building.

If a manual tape rewinding member is provided, the device is easier to make ready for reuse.

I claim:

1. A portable slow-descending device comprising:
- a lifeline in the form of a tape made of a synthetic material;
- a reel on which said life line is wound in superposing layers, said reel including a cylinder and opposing rims;
- a frame for rotatably supporting a shaft of said reel at both ends of the shaft;
- a suspension ring connected to said frame and adapted for connecting the device to a person;
- a planetary gear acceleration unit formed within said cylinder; and
- a centrifugal brake mechanism linked to said planetary gear acceleration unit within said cylinder and separated therefrom by a wall member, wherein said device descends with the person connected thereto for enabling access to mechanical parts during descent.

2. A portable slow descending device as set forth in claim 1, wherein said synthetic material is made of aramid fibers.

3. A portable slow-descending device as set forth in claim 1, further including a manual control member integrally connected with said reel supporting shaft for selectively locking said centrifugal brake mechanism during descent of said portable slow-descending device.

4. A portable slow-descending device as set forth in claim 1, further including a manual member for rewinding said lifeline on said reel.

5. A portable slow-descending device comprising:
- a lifeline in the form of a tape made of synthetic fibers;
- a reel for receiving said lifeline in repetitively wound superimposed layers, said reel including a cylinder portion and a pair of rim members, each rim of said pair being formed at opposing ends of the cylinder;
- a rotatable shaft axially formed through the cylinder of said reel;
- a frame member for rotagably supporting opposing ends of said rotatable shaft;
- a planetary gear acceleration unit formed within the cylinder portion of said reel;
- a centrifugal brake mechanism operatively connected to said planetary gear acceleration unit within the cylinder portion of said reel and separated therefrom by a wall member; and
- a manual control member connected to said centrifugal brake mechanism for selectively controlling descent of said device, wherein said device descends with a person connected thereto, thereby enabling constant access to said manual control member during descent.

6. A portable slow-descending device as set forth in claim 5, wherein said lifeline is made of aramid fibers.

7. A portable slow-descending device as set forth in claim 5, further including a manual member for rewinding said lifeline on said reel.

* * * * *